United States Patent [19]

Borde

[11] Patent Number: 4,738,894

[45] Date of Patent: Apr. 19, 1988

[54] PROCESS AND COMPOSITION FOR TRAPPING LIQUIDS

[76] Inventor: Pierre Borde, 13, rue Féron, 95160 Montmorency, France

[21] Appl. No.: 24,582

[22] Filed: Mar. 11, 1987

[30] Foreign Application Priority Data

Mar. 12, 1986 [FR] France ................................ 86 03498

[51] Int. Cl.[4] .................................................. B32B 5/16

[52] U.S. Cl. .................................... 428/283; 427/180; 427/191; 427/294; 427/296; 428/285; 428/286; 428/328; 428/372

[58] Field of Search ............... 428/283, 285, 286, 328, 428/372; 427/180, 191, 294, 296

[56] References Cited

U.S. PATENT DOCUMENTS 4,540,625 9/1985 Sherwood ........................... 428/283

*Primary Examiner*—Marion C. McCamish
*Attorney, Agent, or Firm*—Darby & Darby

[57] ABSTRACT

The invention relates to a process and composition for trapping coloring or non-coloring liquids, in a non-woven textile consisting of fibers, characterized in that said textile is metallized under vacuum by spraying metal particles onto at least one face of the textile and along a portion of its thickness in such a way that the surface fibers, or those in the immediate vicinity of the surface, are coated with metal while remaining independent of each other.

15 Claims, 1 Drawing Sheet

PROCESS AND COMPOSITION FOR TRAPPING LIQUIDS

The present invention relates to a process of trapping coloring or non-coloring liquids, with or without pigment, in a non-woven textile, and to the realization of said process. The following description relates mainly to the automotive field, but it is clear that the process applies to all fields where one tries to trap liquids.

BACKGROUND OF THE INVENTION

In the field of auto making, bodies are painted by immersion in a bath, or by spraying in an enclosure. However, some retouching is almost always needed, and this is done by atomization under pressure or by some other type of spraying onto the body elements. In that case, as in the case of body repair work, it is often necessary to paint the repaired element, being careful to avoid any spray onto adjacent surfaces.

These paint jobs by spraying make it necessary to delimit very precisely the surface to be painted and to protect the adjacent surfaces. This preparation, called "masking", consists in placing on the object to be treated a shield applied and held by an adhesive tape marking off the surface to be painted. The masking is done for example with the aid of a cover which completely protects the vehicle as a whole.

These covers may include panels which permit separating surface elements (door, wing, front hood, etc.) to be repainted, according to French Pat. No. PV 46,310 of the applicant. A shield of soft paper is applied on the edges of the panel cut out and on the sheetmetal, and precisely delimits the surface to be treated. The shield having been glued on the entire perimeter of the surface, there can be no escape of paint toward the remaining surface of the body.

On the other hand, the operators must also protect themselves from the spray, and in general they use special clothing.

The materials used for making the covers and the garments, which may be different, are rather expensive and one tries to reuse them several times. This re-use presents the following major disadvantage:

The cover and the protective clothing receive spots and fine particles of paint. These dry and may flake off. When the cover and the clothing are re-used, very fine flakes of paint are attracted into the spray and sprayed with the paint onto the car body. When the paint dries, the flakes produce a granular effect, which must be avoided.

Thus, while the protective material used protects effectively against direct spray, it does not retain the paint which, once it is dry, can detach therefrom.

These disadvantages are normally resolved by widening the masking shields and by cleaning the protective clothing very often. However, these are only moderately efficient precautions.

Another solution is to use a material having a high absorbent power. The material preferably used is a non-woven textile made of polypropylene fibers. It absorbs the spots and liquid particles of paint well, but loses its flexibility as it absorbs the paint. The flexibility of the material is a very important condition of subsequent re-use. It also presents the disadvantage of strong delamination.

By "delamination" is understood that, every time the adhesive tapes are pulled off, after use, they take along with them a considerable portion of fibers so that the material is progressively destroyed. It is impossible to prevent this delamination by coating a protective film on the fibers of the textile because its absorbent power would be suppressed.

It is an object of the present invention to provide a solution for these drawbacks. This and other objectives will be apparent to skilled practitioners.

SUMMARY OF THE INVENTION

The invention concerns a process of trapping coloring or non-coloring liquids, with or without pigment, in a non-woven textile consisting of fibers, and the realization of said process, and it is characterized in that said textile is metallized under vacuum by spraying metal particles on at least one face of the textile and on a portion of its thickness so that the surface fibers, or those in the immediate vicinity of the surface, are coated with metal while remaining independent of each other.

Preferably, the metal spray is an aluminum spray carried out under vacuum in mercury vapor; and a second means of trapping is provided on the opposite face of said textile. The two sides of the textile may be metallized identically; one side only may be metallized, the other receiving a film of plastic material impermeable to liquids, or one side only is metallized, the other side being covered with a second thickness of non-woven, non-metallized textile identical to the first textile, forming a lining. The fibers are preferably polypropylene, and the plastic film is preferably extruded polyethylene.

DESCRIPTION OF THE DRAWINGS

The invention is further illustrated by the annexed drawings in which.

DETAILED DESCRIPTION

The figures show a non-woven textile 1, composed of tangled fibers 9. Preferably these fibers are of polypropylene, but this condition is not mandatory and any material of this type could be used.

Figure 1:
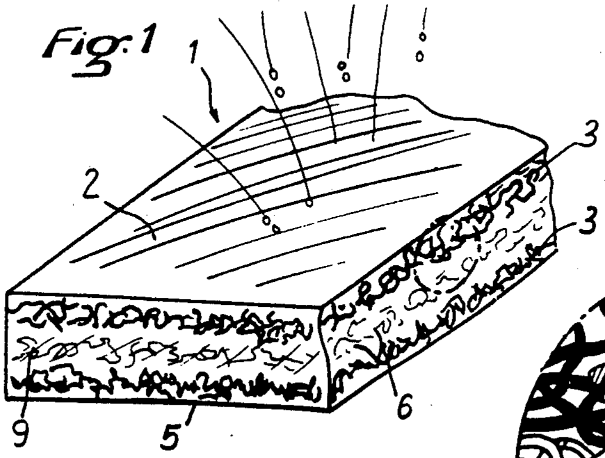
FIG. 1 represents the trapping process and composition according to the invention.
Figure 4:
FIG. 4 represents a detailed view of the trapping of liquid according to the process of the invention.

A liquid trap is obtained in the following manner. A first side of the textile 1, called upper face 2 for convenience of description, is exposed to a spray under vacuum of metal particles (FIG. 1). The quantity of sprayed metal must be such that it coats each superficial fiber without clogging the space 4 between the fibers, i.e. the metallized fibers 3 are not connected together by the metal (FIG. 4); and the metal attains only a fraction of the thickness of the textile, and in no case the opposite lower surface 5.

The textile thus metallized must be about as flexible after as before the treatment.

Preferably, the metallization under vacuum may be done by spraying aluminum into mercury vapors. Good results are obtained by spraying a quantity of 0.5 to 1 $g/m^2$ on a polypropylene material of 30 to 80 $g/m^2$.

In an advantageous, but not indispensable manner, the trap is then completed by applying a second protective coating on the opposite side or underside 5.

The second protective coating will differ according to the realization of the process.

If a trap of sparse and few aerosol ("fog") particles is to be formed to protect the lateral surfaces remote from the surface to be treated, the second protective coating will be a metallization of the underside 5 identical with the metallization of the first side.

The liquid particles 7 are trapped between the two metallized surfaces in a portion 6 of the textile, which may be unmetallized.

Figure 2:
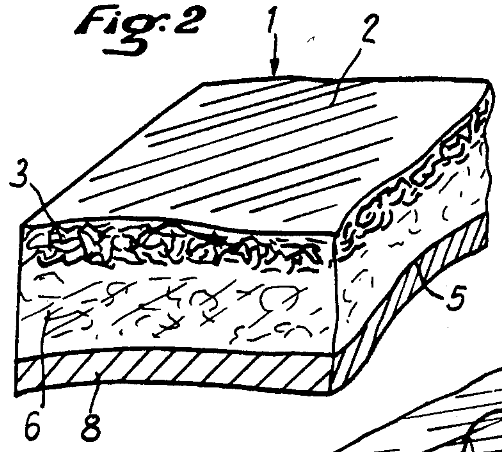
FIG. 2 represents a first variant of the trapping process and composition according to the invention.

If a trap is to be formed for large quantities of paint, as is the case with the sprays on shields in the immediate vicinity of the surface to be treated, the second protective coating will be a thin skin 8 of plastic material (FIG. 2) placed or glued on the underside 5.

The liquid is trapped between the metallized surface and the skin of plastic material. This skin 8 must be impermeable, flexible, thin and light, so that the whole of the textile trap will remain flexible. Preferably, an extruded film of polyethylene is used, but any means of obtaining a thin impermeable film may be used.

Figure 3:
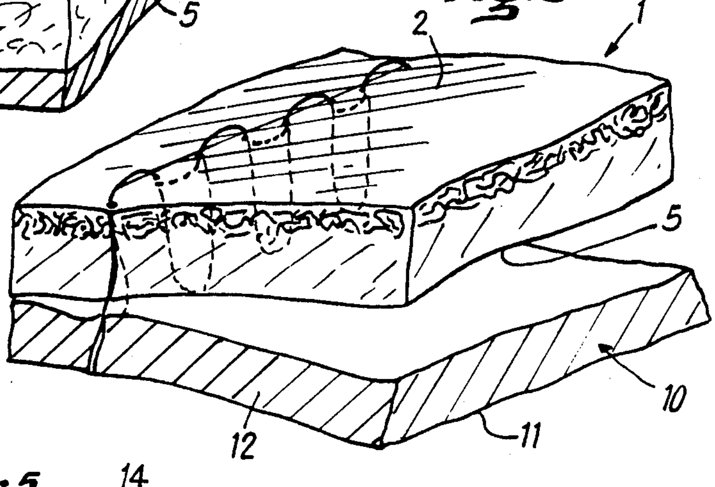
FIG. 3 represents a second variant of the trapping process and composition according to the invention.

If the operator is to be protected against the sparse particles (fog) or the spots due to drops, the second protective coating will be a second thickness of non-woven textile 10 (FIG. 3), untreated, applied against the underside 5. This second thickness is a lining of the protective garment.

The liquid is trapped in the thickness 6 of the first textile and the second thickness 12 of the second textile 10. In this embodiment the two thicknesses are not necessarily contiguous and there may be a space between the two thicknesses, the assembly being obtained by gluing, sewing or welding or any other means on the edges of the pieces.

Liquid trap according to the invention functions as follows.

When a liquid falls on the top side 2, it encounters metallized fibers 3, slides over them, and migrates progressively toward the non-metallized fibers 6. As a result, the liquid disappears from the outer surface 2 in order to be somehow "swallowed up" by the non-metallized inner layer 6.

This disappearance of the liquid from the outer surface 2 allows the metallization of surface 2 to remain practically intact.

When the quantity of liquid is small (particles of paint aerosol for example), one observes that, in contact with a metallized fiber, the particles slide over the fiber and progressively gather around the fiber to form a very small drop 7, practically invisible to the naked eye. Rather surprisingly, the particles do not spread over the fibers and do not fill the space 4 between the fibers; they come together and on the contrary leave the space between the metallized fibers free of liquid.

The drops dry as they adhere around the fiber and cannot detach therefrom to get outside the textile again. They are, therefore, definitely trapped.

When the quantity of liquid increases, the liquid continues its migration into the thickness of the textile and encounters non-metallized fibers 6. The latter absorb the liquid which cannot reach the opposite bottom side 5. Should the fibers 6 be saturated, the liquid might tend to traverse the entire thickness and thus reach the outside surface. This is why a second trapping element according to the invention is advantageously provided.

With a second metallized face, the particles of liquid are no longer absorbed in these new fibers which are metallized but immediately agglomerate in fine drops around them. Preferably, this realization of the trapping process is used for small quantities of liquids.

With trapping by impermeable film, the liquid not absorbed in the thickness of the material encounters the film and spreads over it without traversing it. Experience shows that several layers of paint can be sprayed on the textile. With each spraying the liquid migrates under the upper surface 2 and is absorbed in the non-metallized thickness 6 and is stopped by the impermeable film 8 over which it spreads and dries. The upper surface keeps its metallized outward appearance and its flexibility.

With trapping by double thickness, the liquid (paint spots, for example) traverses the metallized layer and is partly absorbed in the non-metallized thickness of the textile. Generally this first thickness suffices, but in case of a large quantity of liquid, a second thickness of untreated textile absorbs the excess in such a way that on the lower face 11 of the trap thus formed no trace of liquid can appear, the skin or the clothing of the operator being thus totally protected. This realization is preferably used in making protective garments.

The process of trapping liquid according to the invention achieves other advantages. Notably, the textile always remains flexible, even after several layers of liquids. When an impermeable film is used, the tests show that after five layers of paint the textile remains flexible and practically does not become stiff. This flexibility would seem to be due to the fact that on the one hand the metallized fibers 3 always remain free of each other and that the spaces 4 between the fibers are not clogged with liquid. On the other hand, in the non-metallized thickness the liquid diffuses into the thickness at the same time as it is absorbed into the fibers 17 and does not form a block.

The metallized surface resists delamination. When an adhesive tape used for the masking is torn off, the tape becomes detached without carrying away the metallized fibers, nor do the metallized fibers retain the adhesive. Before the placing of the adhesive tape or after its removal, the metallized surface is identical. It is thus possible to re-use the same textile several times in the masking operations.

The outer surface preserves its metallized appearance, the spots of pigment of the liquids received are barely perceptible to the eye and are blurred.

Figure 5:
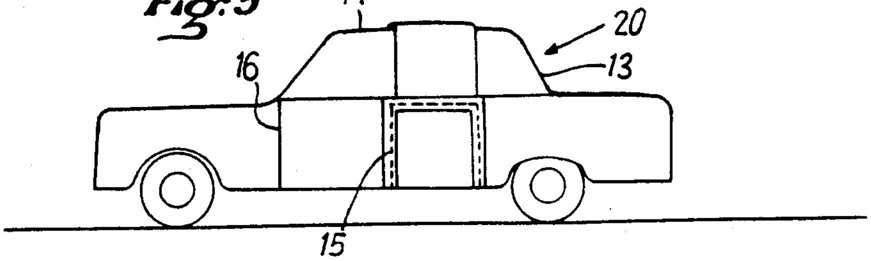
FIG. 5 represents a use of the process according to the invention.

The trapping process is used notably to obtain covers 13 and protective clothing for the operations of paint retouching of car bodies, automobiles, etc (FIG. 5).

Preferably, the covers 13 will be made so as to trap the paint on both sides. In the case of the first realization of the process, the metallization on both faces suffices to make the protection identical on both sides. In the case of the second realization with an impermeable film, to make the trap reversible, it suffices to place a thickness of non-woven metallized textile on the upper face on either side of the impermeable film.

Thus formed, the textile can be cut and folded over, for example on the hood or the roof 14, the lower face becoming the upper face, and being exposed to the sprays.

Advantageously, the cover panels have zippers or slide fasteners 16, which notably facilitate the masking. In fact, the process allows using a cover which entirely covers the vehicle 20. By the slide fasteners 16 one opens up the panel corresponding to the sheetmetal to be painted and the masking takes place without a special shield, directly, by applying an adhesive tape 15 on the edges of the open panel and on the body thus delimited.

The saving of time in the masking operations is very definite. For example, when the frame of a car door is to be retouched, the door must be kept open and the interior of the vehicle protected. In general the masking consists in making a soft panel of paper. And it is difficult to completely close the space corresponding to the door. Normally this operation takes at least 20 minutes. The cover using the process according to the invention reduces this operation to a few minutes.

The foregoing description illustrates the trapping process and refers in particular to the trapping of paint, but this description is not limiting and the process is also suitable for other liquids, notably varnishes, glues, whether pigmented or not, or other chemical products.

The process is used preferably to prevent particles of liquids from becoming detached from a material and getting on to a surface that is to be protected. But, the invention can also find entirely different applications, for example, that of being a decorative material. Since the metallized surface is always free of liquid, the incident light reflects thereon in such a way that the eye does not perceive the fine droplets of liquid agglomerated around the fibers, or the liquid trapped on the impermeable film, only the metallic appearance is seen.

If the light illuminates the textile on the lower face where the liquid is located, the upper face then takes on the metallized appearance tinted with the pigment of the trapped liquid.

The trapping, therefore, can also be used for purposes of interior decoration, or arrangement of interiors.

We claim:

1. A composition for trapping coloring or non-coloring liquids comprising, a non-woven textile substrate having polypropylene fibers and first and second surfaces, and a first coating of metal particles applied under a vacuum on said first surface of said textile and along a portion of its thickness whereupon fibers at or proximate to said surface are coated with said metal particles in a quantity of 0.5 to 1 $g/m^2$ for 30 to 80 $g/m^2$ of polypropylene, to achieve a metallized layer, said fibers remaining independent of each other, a second coating affixed to said second surface and selected from the group consisting of a second said metallized layer, an extruded polyethylene plastic film impermeable to liquid, and an additional textile material.

2. A composition for trapping coloring or non-coloring liquids comprising, a non-woven textile substrate having fibers and first and second surfaces, and a coating of metal particles applied under a vacuum on at least one surface of said textile and along a portion of its thickness whereupon fibers at or proximate to said surface are coated with said metal particles to achieve a metallized layer, said fibers remaining independent of each other.

3. A composition according to claim 2 additionally comprising a second liquid trapping layer provided to the surface of the textile opposite the one said metallized layer.

4. A composition according to claim 3, wherein the second liquid trapping layer comprises a plastic film material that is impermeable to liquids.

5. A composition according to claim 4 wherein the plastic film is extruded polyethylene.

6. A composition according to claim 2 wherein both surfaces are coated with said metal particles to achieve metallized layers.

7. A composition according to claim 2 wherein the fibers of the textile are polypropylene.

8. A composition according to claim 9 wherein a second textile is provided adjacent to the surface opposite at least one said metallized layer.

9. A process for trapping coloring or non-coloring liquids in a non-woven textile consisting of fibers, comprising the step of spraying metal particles under a vacuum on at least one surface of said textile and along a portion of its thickness whereupon fibers at or proximate to said surface are coated with said metal particles to achieve a metallized layer, with said fibers remaining independent of each other.

10. A process according to claim 9, wherein a second liquid trapping layer is provided to the surface of the textile opposite the one said metallized layer.

11. A process according to claim 10, wherein the second liquid trapping layer comprises a plastic film material that is impermeable to liquids.

12. A process according to claim 11 wherein the plastic film is extruded polyethylene.

13. A process according to claim 9 wherein both surfaces are coated with said metal particles to achieve metallized layers.

14. A process according to claim 9 wherein the fibers of the textile are polypropylene.

15. A process according to claim 9 wherein a second textile is provided adjacent to the surface opposite said metallized layer.

* * * * *